April 25, 1944.   O. B. ROSEN   2,347,367
DUPLICATING MACHINE
Filed May 1, 1941    3 Sheets-Sheet 2
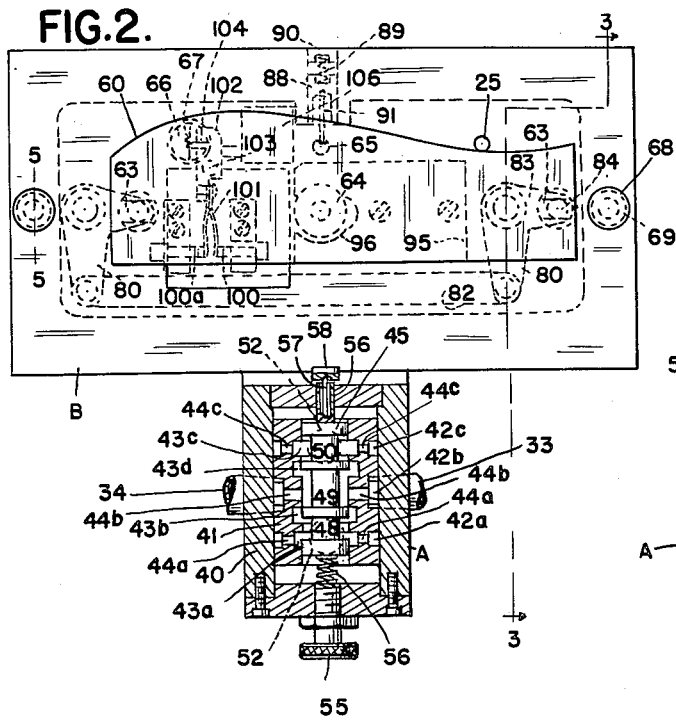
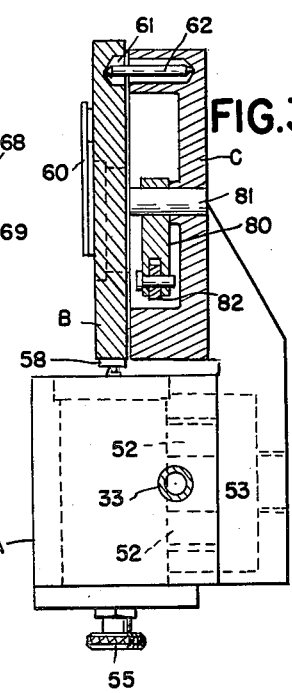
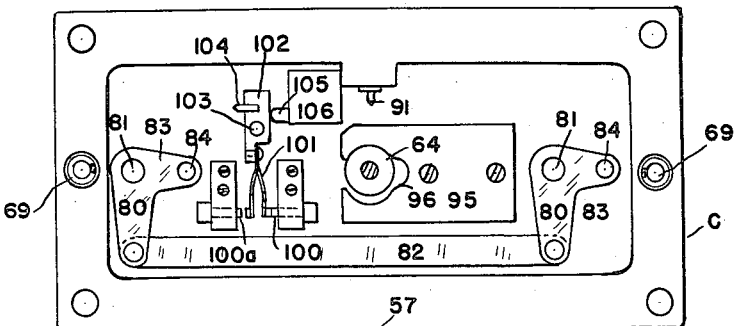
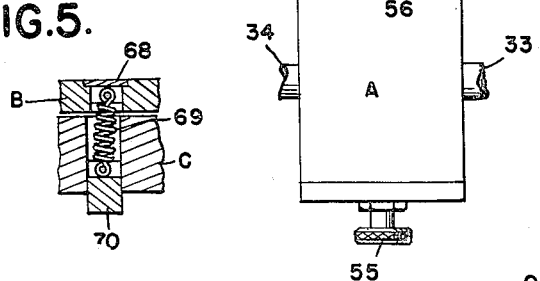
INVENTOR.
OSCAR BORJE ROSEN
BY Swan, Doye, & Hardesty
ATTORNEYS April 25, 1944.　　O. B. ROSEN　　2,347,367
DUPLICATING MACHINE
Filed May 1, 1941　　3 Sheets-Sheet 3

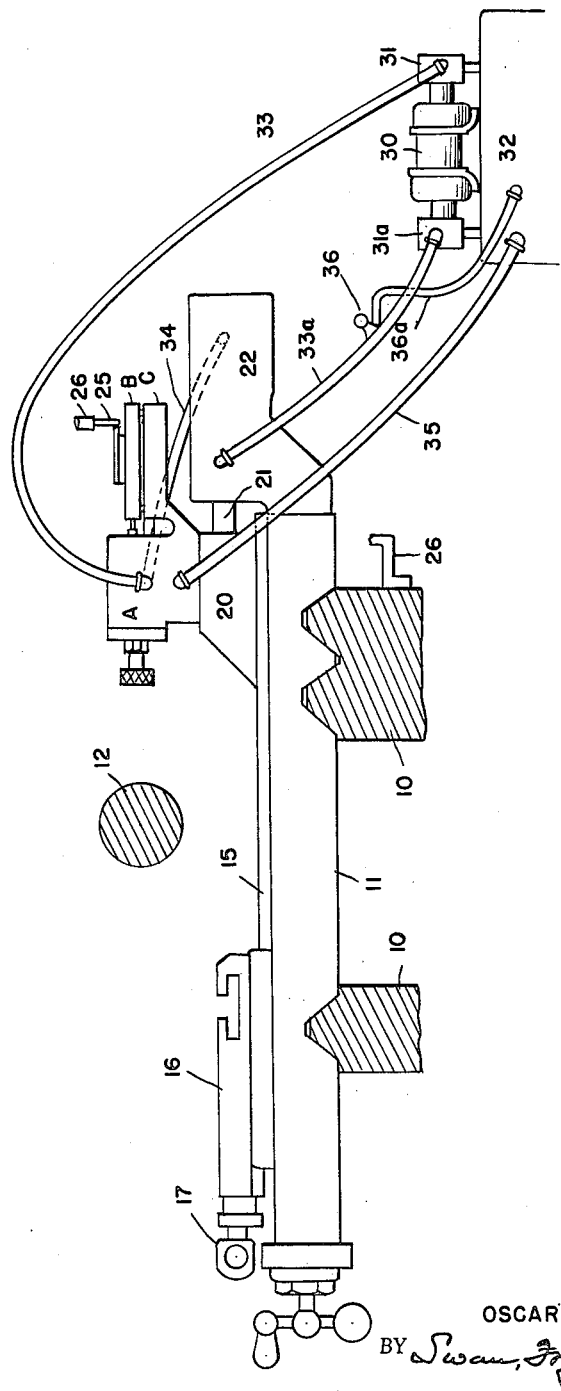

INVENTOR.
OSCAR BORJE ROSEN
BY Swan, Boyce, + Hardesty
ATTORNEYS

Patented Apr. 25, 1944

2,347,367

UNITED STATES PATENT OFFICE 2,347,367

DUPLICATING MACHINE

Oscar Borje Rosen, Detroit, Mich.

Application May 1, 1941, Serial No. 391,360

8 Claims. (Cl. 82—14)

The present invention relates to duplicating machines in which the cutting of the stock is controlled automatically through the action of a pattern or template on a tracer finger and more specifically to means for hydraulic operation and control of the cutting operation.

Among the objects of the invention is means by which the hydraulic pressures on opposite sides of a piston in a suitable cylinder, serving as a motor, may be directly controlled through the action of a tracer.

Another object is means by which the pattern or template, through a limited movement, controls the cutting action.

Still another object is hydraulic tracer construction which is simpler and less difficult to construct and operate than those heretofore used.

Other objects will readily occur to those skilled in the art upon reference to the following description and the accompanying drawings in which Fig. 1 is a more or less diagrammatic view, partly in section, showing an adaptation of the invention to a lathe.

Fig. 2 is a plan view partly in section of the pattern or template, its mounting and action.

Fig. 3 is a section on line 3—3 of Fig. 2.

Fig. 4 is a plan view of the assembly of Fig. 2, but with the template and its mounting plate removed.

Fig. 5 is a section on line 5—5 of Fig. 2.

Figure 6:
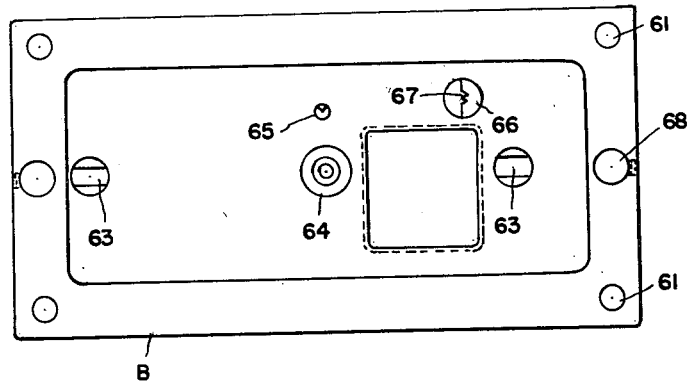
Fig. 6 is an underside view of the template mounting plate.

In the drawings, a stationary lathe bed is indicated by the angular slides 10 and a tool carriage 11 shown as mounted for longitudinal movement upon the slides 10, and actuated by the conventional feed screw (not shown). The work piece is indicated in section at 12, this being supported and driven in the conventional manner. Mounted upon the tool carriage 11 and slidable crosswise of the carriage is a tool slide 15 provided with means 16 for mounting a tool post and tool (not shown) for acting on the work 12 and which means 16 may be movable relative to the slide 15 as by the adjusting screw 17.

At a suitable location on the slide 15 is fixed a support 20 carrying a piston rod 21 which extends into a suitable cylinder 22 mounted upon the carriage 11, the axes of the cylinder 22 and rod 21 being parallel to the line of movement of slide 15.

Also mounted upon support 20 is the control assembly, shown in detail in Figs. 2 to 6, which assembly consists briefly of a valve assembly A and a template supporting plate B, the latter being movable upon a bed C through the action upon the template of a stationary finger 25 carried by means of suitable supporting means upon the stationary portion 10 of the lathe. Such support is indicated by the bracket and arm portion both numbered 26.

In a suitable location adjacent the lathe is provided a motor 30 to which are connected a pair of fluid pumps 31 and 31a drawing from a tank 32 and delivering the fluid under pressure through flexible conduits 33 and 33a to the valve assembly A and one end of cylinder 22, respectively.

Two other flexible conduits 34 and 35 lead from the valve assembly A to the other end of the cylinder 22 and the tank 32, respectively, while the conduit 33a is provided with a safety valve 36 adjustable to maintain a constant pressure in this conduit and its end of cylinder 22, excess fluid flowing from the valve 36 back to tank 32 through conduit 36a.

Referring now to Figs. 2 to 6, the valve assembly A is seen to consist of a cylindrical housing 40 closed at its ends and having fitted therein a cylindrical housing 41. The latter is, as shown, provided with three peripheral grooves 42a, 42b, and 42c, and with four grooves 43a, 43b, 43c and 43d in its inner periphery, grooves 42a and 43a being connected by a plurality of openings 44a. Likewise grooves 42c and 43c are connected by openings 44c while groove 42b connects with either 43b or 43d through openings 44b, the particular one depending upon the position of the valve plunger 45.

The plunger 45 consists of a grooved cylindrical member having three grooves 48, 49 and 50, the intermediate one being somewhat wider than the other two, while the ribs between are narrower than the grooves 43a, 43b and 43c and are so located that, at an intermediate position, communication is established between e. g., grooves 43c and the valve groove 49 and hence the passages 44b. At the ends of the valve movement, such communication is prevented.

Fluid flowing into the valve through conduit 33 will pass directly through the valve assembly from conduit 33 to 34 when the valve 45 is at either end of its movement but when the valve is moved to an intermediate position some of the fluid is by-passed to the end grooves 43a and 43c and thence to grooves 42a and 42c, from which it flows through openings 52 to a chamber 53 to which is connected the return conduit 35.

At the outer end of the assembly A is provided an adjusting screw 55 adapted to adjust the tension upon a spring 56 acting upon one end of valve 45. In the other end of the housing is a thimble 56 slidable in and out and acting against the other end of the valve 45. The open end of the thimble is outside of the housing and the bottom of the thimble cavity is provided with a conical depression receiving the pointed end of a pin 57, the other end of which is seated in a similar depression in a small plug 58 set in the edge of the template mounting plate B.

The plate B on its upper side is substantially smooth plate provided with suitable means by which there may be fixed to it a template, one being shown at 60. The underside of the plate B is shown more clearly in Fig. 6 which shows the plate to be provided in its corners with shallow holes 61 having conical depressions in their bottoms. These are for the purpose of receiving the taper end pins 62 of smaller diameter than the holes, which pins serve to support the plate in spaced relation to the bed C and allow a small universal lateral movement. Plate B is likewise provided with slotted openings 63, the slots running lengthwise as shown. The purpose of these will be shown later.

There are also fixed to the bottom of the plate a roller 64, substantially centrally located, a fixed abutment such as the pin 65, and the substantially semi-circular block 66 having notches 67 in its straight side.

At each end of the plate is an opening in which is seated a plug 68 (see Fig. 5) to which is fixed a tension spring 69, the other end of the spring being fixed to a plug 70 in turn fixed in the bed C.

In the bed C are provided holes 71 with conical bottoms adapted to register with and coact with pins 62 to support and space plate B while the springs 69 serve to hold these several parts together. As indicated in Fig. 3, the bed C is hollowed out and in the space are mounted the several parts shown best in Fig. 4.

These parts include means for compelling a parallel movement of the plate B, consisting of the bellcranks 80 swinging about the pins 81 and having their longer arms connected by a link 82. The shorter arms 83 of the cranks carry upwardly projecting pins 84 adapted to enter and coact with the slots 63 in plate B, compelling parallel movement, whether it be lengthwise or crosswise of the bed C.

In the outer wall of the hollowed bed member and directly opposite the valve assembly A is located a slidably mounted thimble 88 urged inwardly by a spring 89, the tension of which may be adjusted through the action of a screw plug 90. In a conical seat in this thimble rests one end of a taper-end pin 91 of less diameter than the thimble bore, the other end of the pin coacting with an angular seat in the abutment 65.

Through the action of the several pins 62 and 91 and their associated parts, together with springs 56, 69 and 89, the plate B is, so to speak, floated in spaced relation above the bed C and resiliently held in centered position thereover.

In addition to the parts mentioned, the bed C also carries a plate 95 which is provided in one end with a notch 96 of which the side walls are far enough apart to admit and coact with the roller 64 carried by the plate B. These walls are provided with oppositely arranged arcuate portions curved on a radius slightly longer than the radius of roller 64.

Also fixed in bed C are a pair of spaced electric contacts 100 and 100a, and between these a pair of spring contact arms 101 fixed together and to a block of insulating material 102 pivoted at 103. This block 102 is provided in the end beyond the pivot 103 with a laterally projecting tapered pin 104 adapted to coact with a notch 67 in block 66 carried by plate B. Further, opposite the pin 104 and arranged to press pin 104 into its notch 67 is a spring actuated plunger 105 mounted in a block 106.

The spring contact arms 101 should be so arranged that, when the block 102 is in its central position, both contacts are made. However, pivotal movement of the block will break the circuit by flexing one of the springs sufficiently to permit the other to leave its stationary contact. The contacts 100, 100a are connected in a circuit controlling the movement of slide 11, which circuit is so arranged that when closed the progress of the slide is continuous, but when broken the progress is stopped.

The assembled relation of plate B and bed C is shown in Fig. 2, which also indicates the operation of the device. As indicated by this figure, when the slide 11 in its movement causes the template 60 to contact the stationary finger 25, the template is moved slightly. If the movement is due to the finger meeting an abrupt surface, longitudinal movement is converted into lateral movement by the roller 64 coacting with the notch in plate 95. Such movement immediately causes lateral movement of pin 104 in notch 67 and thereby swings block 102 sufficiently to break the circuit through contacts 100, 100a and stop forward progress of slide 11. At the same time, such lateral movement of plate B moves the valve 45.

If, however, the pin 25 strikes a moderate slope such as is indicated in Fig. 2, the lateral movement is insufficient to break the electric circuit but nevertheless moves the valve 45.

In initially adjusting the valve 45, the safety valve 36 and the pump operation, these are so arranged as to provide in the two ends of cylinder 22 equal pressure when a small proportion of fluid is being by-passed through conduit 33, the several grooves 43, 42, chamber 53 and conduit 35 to the tank.

When, therefore, the valve 45 is moved to the closed position of Fig. 2, no fluid is by-passed and hence a greater pressure will develop in the outer end of cylinder 22 and immediately move the slide 15 to the left (Fig. 1).

On the other hand, when the valve 45 is moved in the other direction (i. e., down in Fig. 2) more fluid is by-passed and hence the pressure in the outer end of cylinder 22 is reduced below that in the inner end and the slide 15 is therefore moved to the right (Fig. 1).

While the foregoing description relates to the use of a movable template and fixed finger, the same principles may be used with a fixed template and a tracer having a movable finger. Such an arrangement is shown in Fig. 7.

In this figure, the pump 30, 31, 31a may be identical with the preceding as may also the cylinder 22, and the several conduits and safety valve 36, excepting the conduit leading to the valve assembly A.

Figure 7:
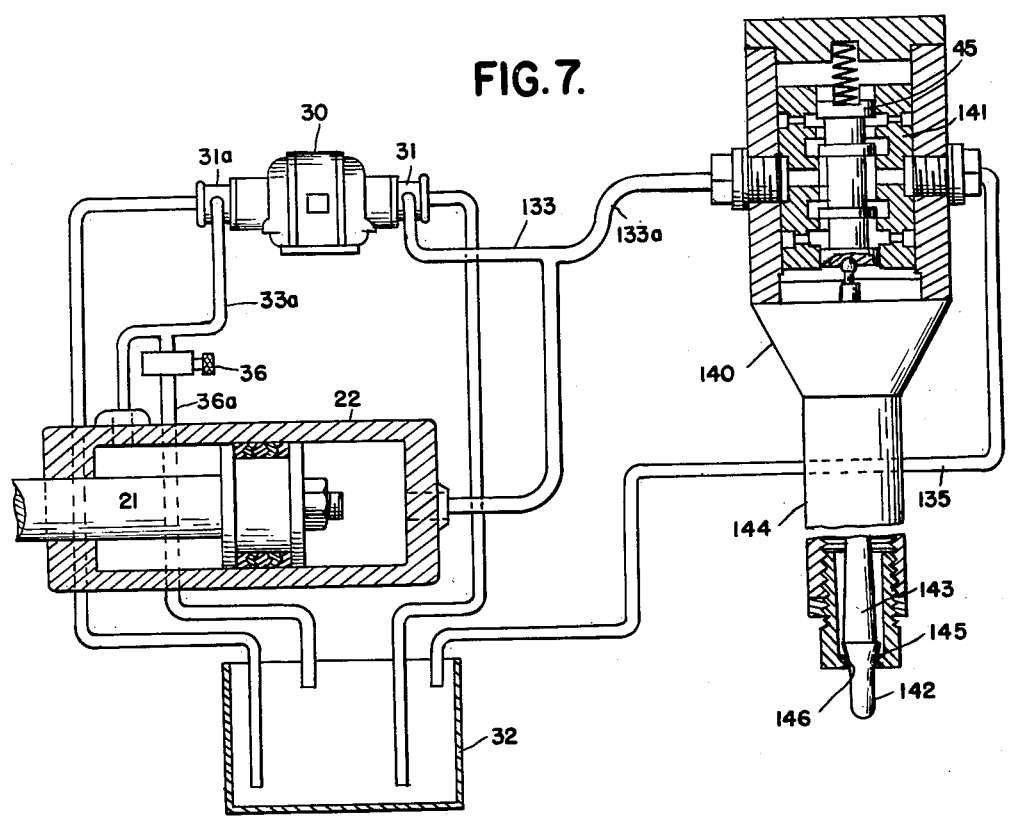
Fig. 7 is a view, with parts in section, of a tracer control device embodying some of the elements of the structure of Figs. 1 to 6.

In Fig. 7, a conduit 133 leads from pump 31 to cylinder 22 but is provided with a branch 133a eading to the tracer 140, a return conduit 135 eading from the tracer back to tank 32.

The tracer 140 consists of a valve body 141 identical with the valve of assembly A except that the valve plunger 45 is moved through the action of a movable finger 142, forming a portion of a rod 143 of suitable length. This rod is enclosed in an extension 144 of the valve housing from which it projects a short distance, the projecting end constituting the finger 142. The upper end of rod 143 coacts directly with the valve plunger 45.

At the lower end of extension 144 where the rod passes out, the latter is provided with a conical portion 145 serving to maintain the rod within the extension and also providing a sloping surface which causes the rod to move endwise whenever the finger 142 is moved laterally. In order to facilitate such endwise movement, the edge of the opening 146, through which the rod projects, is preferably rounded as shown.

The adjustment and operation of the tracer 140 is the same as that already described for Figs. 1 to 6.

I am aware that the invention may be embodied in other specific forms without departing from the spirit or essential scope thereof, and I therefore desire the present embodiments to be considered in all respects as illustrative and not restrictive; reference being had to the appended claims rather than to the foregoing description to indicate the scope of the invention.

I claim:

1. In a duplicating cutting machine including means for moving the work and tool relatively toward and from each other and means for moving the one relatively past the other, and a pattern to be duplicated, a platform carried by the latter moving means and to which said pattern is fixed, mounting means for said platform constructed and arranged to provide for the latter a limited universal movement relative to its carrier, a stationary finger element with which said pattern is adapted to contact when moved by said latter moving means to thereby cause said relative movement on said universal mounting, and means actuated by the said relative movement of the platform to cause movement of the tool and work toward and from each other.

2. In a duplicating cutting machine wherein the cutting of the work is controlled by the action of a tracer upon a pattern, a stationary tracer finger, means for mounting said pattern so as to provide a small lateral movement, means for moving said pattern in a direction parallel to the work so as to contact said finger and thereby cause said lateral movement, and means controlled by said lateral movement for causing movement of the pattern in a direction at right angles to the said parallel movement.

3. In a duplicating cutting machine wherein the cutting of the work is controlled by the action of a tracer upon a pattern, a stationary tracer finger, means for mounting said pattern so as to provide a small lateral movement, means for moving said pattern in a direction parallel to the work so as to contact said finger and thereby cause said lateral movement, means controlled by said lateral movement for causing movement of the pattern in a direction at right angles to the said parallel movement, and means also controlled by said lateral movement for regulating the progress of said pattern in the said parallel movement.

4. In a duplicating cutting machine having a movable slide, a cutting tool and a pattern mounted on said slide and adapted to be moved past a workpiece and tracer finger respectively, means for mounting said pattern on said slide, said mounting means permitting a limited movement of the pattern relative to the slide, means for fixing the tracer against movement whereby contact of the tracer with the pattern causes movement of the latter relative to the slide, and means movable by said pattern in said relative movement for controlling the movement of said tool toward and from said workpiece.

5. In a duplicating cutting machine having a movable slide, a cutting tool and a pattern mounted on said slide and adapted to be moved past a workpiece and tracer finger respectively, means for mounting said pattern on said slide, said mounting means permitting a limited movement of the pattern relative to the slide, means for fixing the tracer against movement, whereby contact of the tracer with the pattern causes movement of the latter relative to the slide, and means movable by said pattern in said relative movement for controlling the movement of said tool toward and from said workpiece, and other means controlled by said relative movement for regulating the travel of the workpiece and pattern past the tool and tracer.

6. In a machine lathe having a tool slide movable lengthwise of the work and a tool carrier movable to and from said work, means for mounting a template upon said tool carrier and providing a limited movement relative thereto, a fixed tracer finger adapted to contact said template as said slide is moved and thereby cause said relative movement, a motor carried by said tool carrier for causing movement of said tool toward and from the work, and control means for said motor actuatable by said relative movement between said template and tool carrier.

7. In a machine lathe having a tool slide movable lengthwise of the work and a tool carrier movable to and from said work, means for mounting a template upon said tool carrier and providing a limited movement relative thereto, means for moving said slide, a fixed tracer finger adapted to contact said template as said slide is moved and thereby cause said relative movement, a motor carried by said tool carrier for causing movement of said tool toward and from the work, control means for said motor actuatable by said relative movement between said template and tool carrier, and additional control means actuatable by said relative movement for regulating the movement of said slide lengthwise of the work.

8. In a machine lathe, a tool slide movable lengthwise of the work and a tool carrier movable on said slide at right angles to said work, an hydraulic motor carried by said slide and arranged to move said carrier thereon, and control means for said motor, said control means consisting of a valve carried by the tool carrier, a template carrier adjacent thereto and having a template fixed thereon, a supporting bed for said carrier, means for supporting said carrier in spaced relation above said bed and arranged to permit a limited movement of said carrier with respect thereto, a stationary element adapted to contact said template as the slide is moved, and means actuatable by said template carrier to actuate said valve and thereby cause operation of said motor to move said tool carrier.

OSCAR BORJE ROSEN.